(12) United States Patent
Vollert et al.

(10) Patent No.: US 8,840,198 B2
(45) Date of Patent: Sep. 23, 2014

(54) METHOD FOR OPERATING A HYDRAULIC VEHICLE BRAKING SYSTEM THAT HAS AN ANTI-LOCK CONTROL UNIT

(75) Inventors: Herbert Vollert, Vaihingen/Enz (DE); Reinhard Weiberle, Vaihingen/Enz (DE); Timo Jahnz, Besigheim (DE); Volker Mehl, Weingarten (DE); Jens Kolarsky, Bietigheim/Bissingen (DE); Stephan Hoenle, Leonberg (DE); Frank Kneip, Hütschenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 270 days.

(21) Appl. No.: 13/201,021

(22) PCT Filed: Dec. 14, 2009

(86) PCT No.: PCT/EP2009/067029
§ 371 (c)(1),
(2), (4) Date: Dec. 12, 2011

(87) PCT Pub. No.: WO2010/091756
PCT Pub. Date: Aug. 19, 2010

(65) Prior Publication Data
US 2012/0074771 A1    Mar. 29, 2012

(30) Foreign Application Priority Data
Feb. 11, 2009    (DE) .................... 10 2009 000 781

(51) Int. Cl.
*B60T 8/44*    (2006.01)
*B60T 13/74*   (2006.01)
*B60T 8/42*    (2006.01)
*B60T 13/68*   (2006.01)
*B60T 8/48*    (2006.01)

(52) U.S. Cl.
CPC ............. *B60T 8/4872* (2013.01); *B60T 8/4291* (2013.01); *B60T 13/745* (2013.01); *B60T 13/686* (2013.01)
USPC ....................... 303/114.1; 303/113.1; 303/11

(58) Field of Classification Search
USPC .......... 303/113.1–113.3, 114.1, 115.1–115.2, 303/3
See application file for complete search history.

(56) References Cited

U.S. PATENT DOCUMENTS

| 4,950,027 | A  | * | 8/1990 | Reinartz et al. | ............. 303/113.3 |
| 6,412,881 | B1 | * | 7/2002 | Isono | ......................... 303/114.1 |

(Continued)

FOREIGN PATENT DOCUMENTS

| CN | 101254784 A | 9/2008 |
| DE | 103 27 553  | 1/2005 |

(Continued)

OTHER PUBLICATIONS

International Search Report corresponding to PCT Application No. PCT/EP2009/067029, mailed Apr. 1, 2010 (German and English language document) (11 pages).

*Primary Examiner* — Anna Momper
(74) *Attorney, Agent, or Firm* — Maginot, Moore & Beck

(57) ABSTRACT

A method for operating a hydraulic vehicle braking system that has an anti-lock control unit is disclosed. The system includes a brake master cylinder having an electromechanical brake booster. As the pressure level of the vehicle braking system decreases during an anti-lock control, in which all vehicle wheels are controlled, the boosting force of the brake booster is reduced in an anti-lock control of this type.

7 Claims, 1 Drawing Sheet

(56) References Cited

U.S. PATENT DOCUMENTS 8,348,352 B2 * 1/2013 Nishino et al. .......... 303/122.05
8,500,213 B2 * 8/2013 Ohtani et al. .................... 303/3

FOREIGN PATENT DOCUMENTS

| | | |
|---|---|---|
| DE | 10 2007 016 861 | 10/2008 |
| EP | 0 379 329 | 7/1990 |
| EP | 1 964 739 | 9/2008 |
| FR | 2 860 474 | 4/2005 |
| JP | 9-175360 A | 7/1997 |
| JP | 2000-280880 A | 10/2000 |
| JP | 2006-312387 A | 11/2006 |
| JP | 2008-239142 A | 10/2008 |
| WO | 2004/005095 | 1/2004 |
| WO | WO 2007034961 A1 * | 3/2007 |

* cited by examiner

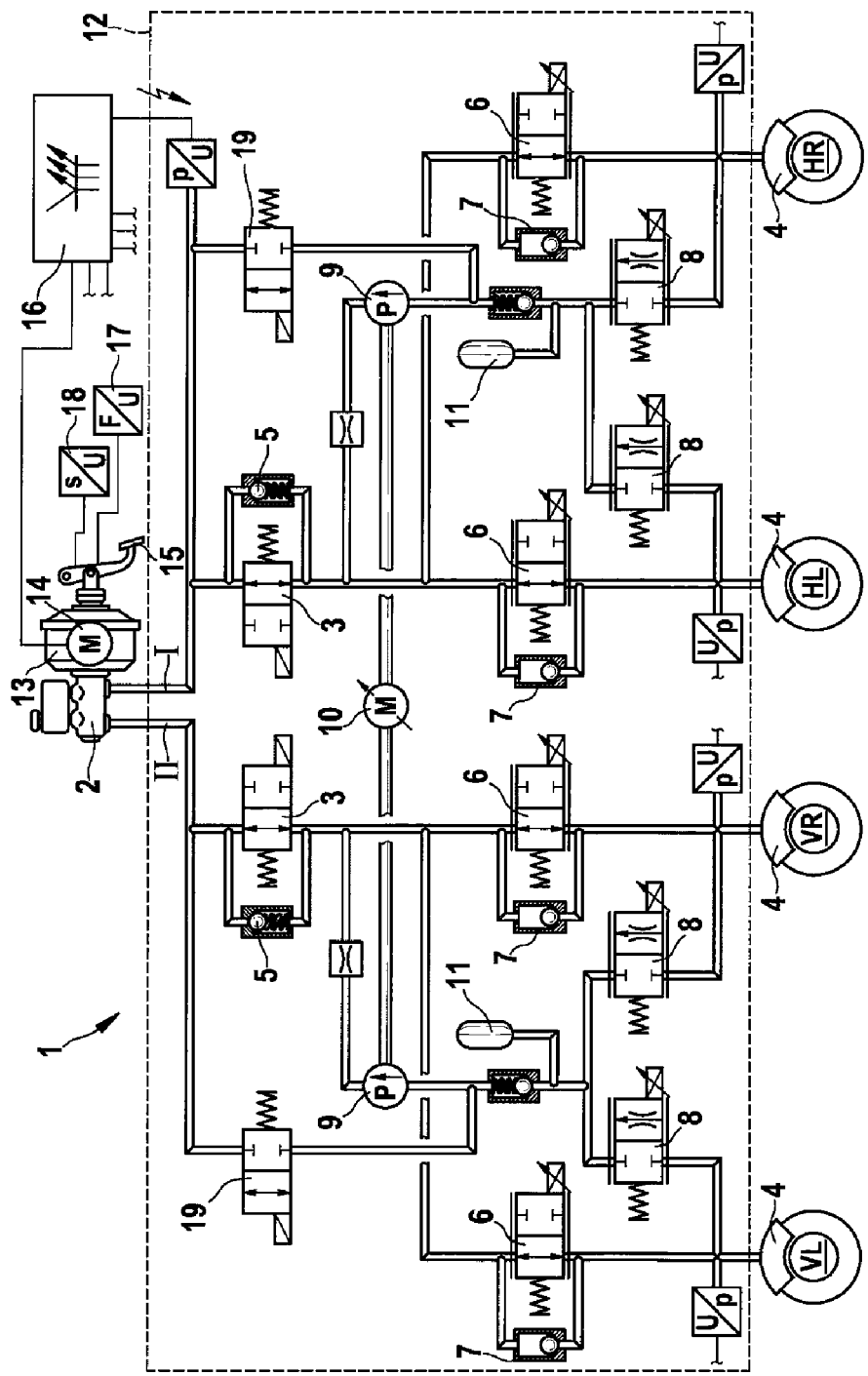

METHOD FOR OPERATING A HYDRAULIC VEHICLE BRAKING SYSTEM THAT HAS AN ANTI-LOCK CONTROL UNIT

This application is a 35 U.S.C. §371 National Stage Application of PCT/EP2009/067029, filed Dec. 14, 2009, which claims the benefit of priority to Application Serial No. DE 10 2009 000 781.4, filed Feb. 11, 2009 in Germany, the disclosures of which are incorporated herein by reference in their entirety.

BACKGROUND

The disclosure relates to a method for operating a hydraulic vehicle brake system which has a master brake cylinder with a controllable brake booster.

Laid-open patent application DE 103 27 553 A1 discloses such a hydraulic vehicle brake system which, with the exception of the brake booster, is of conventional design. The vehicle brake system has a dual-circuit master brake cylinder to which four wheel brakes are connected divided into two brake circuits. A dual-circuit vehicle brake system is not compulsory for the disclosure, just as a plurality of wheel brakes is not compulsory. In addition, the known vehicle brake system has a wheel slip control device for which terms such as (brake) anti-lock control device, traction control device, vehicle movement dynamics control device and/or stability control device as well as the abbreviations such as ABS, TCD, VMDC, ESP are customary. The hydraulic part of the wheel slip control device comprises a brake pressure-increasing valve and a brake pressure-decreasing valve for each wheel brake, as well as, for each brake circuit, a hydraulic pump, a separating valve with which the master brake cylinder can be disconnected hydraulically from the brake circuit, and an intake valve by means of which the master brake cylinder can be connected to a suction side of the hydraulic pump for the purpose of quickly increasing the brake pressure. Such wheel slip control devices and their method of functioning are known per se and will not be explained in more detail at this point.

Instead of a partial-vacuum brake booster, the known vehicle brake system has an electro-mechanical brake booster with a hollow-shaft electric motor whose rotor has a nut of a spindle drive, which nut converts the rotational driving movement of the electric motor into a translatory movement for activating the master brake cylinder. Other designs of an electro-mechanical brake booster are possible for the disclosure, for example the brake booster can have a toothed rack gearing system, preferably with a worm for driving the toothed rack, for converting the rotational driving movement of an electric motor into a translatory movement for activating the master brake cylinder. An electro-mechanical brake booster with a linear motor, an electromagnet or a piezo-element can also be used for the method according to the disclosure. The enumeration is not exhaustive.

The vehicle brake system is an auxiliary force brake system, i.e. an activation force for activating the master brake cylinder is applied partially as a muscle force by a vehicle driver and also as an extraneous force by the electro-mechanical brake booster. Operation as an extraneous force brake system is also conceivable, in which extraneous force brake system the activation force is generated exclusively as an extraneous force by the brake booster and a muscle force which is applied by a vehicle driver activating the brake, or else an activation travel which is carried out by the vehicle driver, serves as a setpoint variable for performing open-loop or closed-loop control of the force of the brake booster which is referred to as an extraneous force.

SUMMARY

The method according to the disclosure having the features of claim 1 provides that during an anti-lock control operation a force of the brake booster, referred to here as an extraneous force, is reduced. The method according to the disclosure can be applied during a (brake) anti-lock control operation of all the wheel brakes of the vehicle brake system. In anti-lock control operation, the wheel brake pressure in the wheel brakes of the controlled vehicle wheels is usually decreased by opening the brake pressure-decreasing valve. The decreasing of the wheel brake pressure can also be carried out by modulating the wheel brake pressures using the brake pressure-increasing valves and brake pressure-decreasing valves. At any rate, when the wheel brake pressure in all the wheel brakes is decreased, it is not necessary to maintain in the master brake cylinder the relatively high service brake pressure which was present before the start of the anti-lock control operation, or to use the master brake cylinder to increase a brake pressure which would be present without the anti-lock control operation. The reduction in the extraneous force of the brake booster is carried out, in particular, by reducing the boosting of the brake booster. The method according to the disclosure reduces the power consumption of an electro-mechanical brake booster and therefore the thermal loading thereof, as well as reducing the power loading of an electrical on-board power system of a vehicle which is equipped with the vehicle brake system. With the reduction of the extraneous force of the brake booster and therefore of the master brake cylinder pressure, the delivery capacity of a hydraulic pump, usually referred to as a feedback pump, of the wheel slip control device is reduced because it delivers against the reduced master brake cylinder pressure. The reduction in the master brake cylinder pressure and therefore in the pressure level of the vehicle brake system overall also reduces the loading on the other hydraulic components, for example on the solenoid valves of the wheel slip control device, which has a positive effect on the service life thereof. The generation of noise by the wheel slip control device during an anti-lock control operation is reduced by the decreasing of the pressure level. The extraneous force can be reduced continuously or periodically.

Advantageous refinements and developments of the disclosure are set forth below.

Basically, the method according to the disclosure can be applied for all hydraulic vehicle brake systems which have a wheel slip control device or at least one (brake) anti-lock control device and whose master brake cylinder has a controllable brake booster. Controllable means that the extraneous force of the brake booster is not controlled exclusively by the muscle force activation by a vehicle driver but rather that the extraneous force can additionally be subjected to open-loop or closed-loop control, for example, with a control unit. In the case of a partial vacuum brake booster, it is possible to control the extraneous force with, for example, a solenoid valve with which the partial vacuum chamber of the brake booster can be ventilated. The solenoid valve is used to increase, with open-loop or closed-loop control, a counter-pressure in the partial vacuum chamber of a partial vacuum brake booster, such counter-pressure being opposed to the pressure in the working chamber which is usually ventilated by a servovalve which is controlled by the muscle force activation of the brake booster. The disclosure preferably provides an electro-mechanical brake booster whose extraneous force is subjected to electrical open-loop or closed-loop control.

BRIEF DESCRIPTION OF THE DRAWING

The disclosure will be explained in more detail below with reference to the drawing. The single figure shows a hydraulic circuit diagram of a hydraulic vehicle brake system for carrying out the method according to the disclosure.

DETAILED DESCRIPTION

The hydraulic vehicle brake system 1 illustrated in the drawing has a wheel slip control device 12 (anti-lock control system ABS; traction control system TCS; vehicle movement dynamics control system VMDCS, ESP). It is embodied as a dual-circuit brake system with two brake circuits I, II which are connected to a master brake cylinder 2. Each brake circuit I, II is connected to the master brake cylinder 2 via a separating valve 3. The separating valves 3 are 2/2 way solenoid valves which are open in their non-energized home position. A non-return valve 5, through which there can be a flow from the master brake cylinder 2 to wheel brakes 4, is connected hydraulically in parallel with each of the separating valves 3. The wheel brakes 4 are connected via brake pressure-increasing valves 6 to the separating valve 3 of each brake circuit I, II. The brake pressure-increasing valves 6 are 2/2 way solenoid valves which are open in their non-energized home position. Non-return valves 7, through which there can be a flow from the wheel brakes 4 in the direction of the master brake cylinder 2, are connected in parallel with said 2/2 way solenoid valves.

A brake pressure-decreasing valve 8 is connected to each wheel brake 4, said brake-pressure decreasing valves 8 being jointly connected to a suction side of a hydraulic pump 9. The brake pressure-decreasing valves 8 are embodied as 2/2 way solenoid valves which are closed in their non-energized home position. A pressure side of the hydraulic pump 9 is connected between the brake pressure-increasing valves 6 and the separating valves 3, i.e. the pressure side of the hydraulic pump 9 is connected to the wheel brakes 4 via the brake pressure-increasing valves 6, and to the master brake cylinder 2 via the separating valve 3. The brake pressure-increasing valves 6 and the brake pressure-decreasing valves 8 are proportional valves because of the better open-loop control and closed-loop control capabilities. The hydraulic pumps 9 are often referred to as feedback pumps.

Each of the two brake circuits I, II has a hydraulic pump 9, which hydraulic pumps 9 can be jointly driven with an electric motor 10. The suction sides of the hydraulic pumps 9 are connected to the brake pressure-decreasing valves 8. Hydraulic accumulators 11 for accommodating and buffering brake fluid are present on the suction side of the hydraulic pumps 9, said brake fluid flowing out from the wheel brakes 4 as a result of opening of the brake pressure-decreasing valves 8 during a wheel slip control operation.

The brake pressure-increasing valves 6 and the brake pressure-decreasing valves 8 form wheel brake pressure modulation valve arrangements with which, when the hydraulic pump 9 is driven, wheel-specific brake pressure control for controlling wheel slip is possible in a manner known per se and in a way which is not to be explained here. During a wheel slip control operation, the separating valves 3 are closed in any case, i.e. the vehicle brake system 1 is hydraulically separated from the master brake cylinder 2, whenever the master brake cylinder 2 is not activated, in order to be able to increase a hydraulic pressure for activating the wheel brakes 4 with the hydraulic pumps 9. In the case of a (brake) anti-lock control operation during which the master brake cylinder 2 is normally activated and a hydraulic pressure is present in the vehicle brake system 1, the separating valves 3 normally remain open.

The suction side of the hydraulic pump 9 can be connected to the master brake cylinder 2 by means of an intake valve 19 in each brake circuit I, II. The intake valves 19 are 2/2 way solenoid valves which are closed in their non-energized home position. When they are opened, the hydraulic pump 9 sucks in brake fluid directly from the master brake cylinder 2, as a result of which a faster increase in brake pressure is possible with the hydraulic pump 9 when the master brake cylinder 2 is not activated or the vehicle brake system 1 is not pressurized.

The master brake cylinder 2 has an electro-mechanical brake booster 13 which uses an electric motor 14 to generate a force which is referred to here as an extraneous force and which activates the master brake cylinder 2 together with a muscle force which is applied via the brake pedal 15. The symbolically illustrated electric motor 14 is integrated into the brake booster 13. The electric motor 14 can be a rotary motor whose rotational movement is stepped down by means of a transmission and converted into a translatory movement for activating the master brake cylinder 2. An embodiment of the brake booster 13 with an electric linear motor or an electromagnet is also possible. The numeration is not exhaustive.

In order to perform open-loop or closed-loop control of the vehicle brake system 1, including the brake booster 13, an electronic control unit 16 is present. A pedal force which is applied to the brake pedal 15 can be measured with a force sensor 17, and a position of the brake pedal 15 can be measured with a travel sensor 18.

According to the disclosure, the extraneous force which the brake booster 13 applies to the master brake cylinder 2 is reduced during an anti-lock control operation (ABS). The force boosting by the brake booster 13 is reduced. After the anti-lock control operation has ended, the brake booster 13 is subjected again to open-loop or closed-loop control as provided. The method according to the disclosure is applied during a (brake) anti-lock control operation if the vehicle wheels tend to lock during activation of the vehicle brake system 1, in particular if all the braked vehicle wheels tend to lock when the brakes are activated, and the vehicle wheels have slip control.

If the separating valves 3 are closed at the time of an anti-lock control operation, the extraneous force of the brake booster 13 can be reduced greatly and even as far as zero. It is also possible to reduce the extraneous force of the brake booster 13 in the event of an anti-lock control operation to an empirical value, that is to say to a predefined or predefinable value, which is usually sufficient to activate the brakes in the event of an anti-lock control operation. The brake booster 13 can also be subjected to open-loop or closed-loop control during an anti-lock control operation such that a master brake cylinder pressure in the master brake cylinder 2 is at least as high as the maximum wheel brake pressure in the wheel brakes 4. A relatively high pressure in the master brake cylinder 2 is not necessary. It is also possible, by way of precaution, to set a master brake cylinder pressure which is higher by a factor or a specific value, by performing open-loop or closed-loop control of the brake booster 13. A further possibility is to perform open-loop or closed-loop control of the brake booster 13 during an anti-lock control operation in such a way that the master brake cylinder pressure in the master brake cylinder 2 is not lower than an anti-lock pressure in the wheel brakes 4. The anti-lock pressure is the pressure which is sufficient to lock the braked vehicle wheels. A master brake cylinder pressure which is higher by a factor or a specific value can also be set by open-loop or closed-loop control here.

If the hydraulic pumps 9 are operated during an anti-lock control operation, their delivery Pressure—assuming that the separating valves 3 are open—increases the master brake cylinder pressure and/or the brake fluid volume which is delivered into the master brake cylinder 2 by the feedback pumps 9 moves the brake pedal 15 back. In all cases, a vehicle driver is provided, via the brake pedal 15, with feedback which he will normally experience as disruptive and which can unsettle him. For this reason, one refinement of the method according to the disclosure provides for the brake booster 13 to be adjusted by open-loop or closed-loop control to its position, i.e. the shifting of the master brake cylinder piston or pistons. The open-loop or closed-loop control can take place in such a way that the position of the activated brake booster 13 remains unchanged or open-loop or closed-loop control is possible, for example, in dependence on the travel sensor 18 and/or the force sensor 17. A further possibility is torque control of the electric motor 14 of the brake booster 13. It is generally possible to refer to closed-loop or open-loop control of a characteristic variable of the brake booster 13, wherein the selected characteristic variable must permit at least partial compensation of the effect of the delivery pressure of the hydraulic pumps 9 on the master brake cylinder 2. The force boosting of the brake booster 13 is increased in the explained closed-loop and open-loop control operations so that the muscle force which is applied to the brake pedal 15 by the vehicle driver does not change as a result of the delivery pressure of the hydraulic pumps 9 when the latter are operated during an anti-lock control operation.

Another strategy is to increase the master brake cylinder pressure in the master brake cylinder 2 by increasing the extraneous force of the brake booster 13 without increasing the muscle force applied to the brake pedal 15. In other words, the master brake cylinder pressure which is decreased during an anti-lock control operation by reducing the extraneous force of the brake booster 13 is increased when the hydraulic pumps 9 are operated. However, the extraneous force of the brake booster 13 remains lower than would be the case without the anti-lock control operation when the given brake activation operation occurs. The delivery pressure of the hydraulic pumps 9, which increases the master brake cylinder pressure, is at least partially compensated by increasing the extraneous force of the brake booster 13, in particular by increasing its force boosting. Nevertheless, the master brake cylinder pressure remains lower than it would be without the anti-lock control operation. For the purpose of explaining and comprehending this strategy, the delivery pressure of the hydraulic pumps 9 can be considered to be, in terms of control technology, an interference variable which changes, in particular increases, the master brake cylinder pressure. The extraneous force of the brake booster 13, that is to say its force boosting, is increased in order to at least partially compensate the delivery pressure of the hydraulic pumps 9. The master brake cylinder pressure is therefore increased by an empirical value, for example, and this increased master brake cylinder pressure is maintained during the operation of the hydraulic pumps 9 during an anti-lock control operation, by performing open-loop or closed-loop control of the brake booster 13. As a result, the reaction of the hydraulic pumps 9 on the master brake cylinder 2, and via the latter on the brake pedal 15, is at least partially compensated.

The invention claimed is:

1. A method, comprising:
operating a hydraulic vehicle brake system which has an anti-lock control device and a master brake cylinder with a controllable brake booster, at least one wheel brake, which is connected to the master brake cylinder via a brake pressure-increasing valve, and a brake pressure-decreasing valve by which a wheel brake pressure of the at least one wheel brake is configured to be decreased, the anti-lock control device having a hydraulic pump whose suction side is connected to the brake pressure-decreasing valve and whose pressure side is connected between the brake pressure-increasing valve and the master brake cylinder;
during an anti-lock control operation, reducing an extraneous force of the brake booster to a first force, which is less than a second force at which the brake booster is operated during a non-anti-lock control operation; and
increasing the extraneous force of the brake booster from the first force to a third force, which is less than the second force, as a function of a pressure difference between the pressure side and the suction side of the hydraulic pump, upon operation of the hydraulic pump during the anti-lock control operation.

2. The method as claimed in claim 1, wherein the controllable brake booster includes an electro-mechanical brake booster.

3. The method as claimed in claim 1, wherein during the anti-lock control operation an extraneous force of the brake booster is reduced as a function of wheel brake pressures in the wheel brakes of the vehicle brake system in such a way that a master brake cylinder pressure is greater than or equal to a maximum wheel brake pressure of the at least one wheel brake.

4. The method as claimed in claim 1, wherein during the anti-lock control operation the extraneous force of the brake booster is reduced as a function of a locking pressure at which vehicle wheels lock, in such a way that the master brake cylinder pressure is greater than or equal to the locking pressure.

5. The method as claimed in claim 1, further comprising:
subjecting a characteristic variable of the brake booster to open-loop or closed-loop control when the hydraulic pump is operated during the anti-lock control operation.

6. The method as claimed in claim 5, wherein a position of the brake booster or a torque of an electric motor of the brake booster is subjected to open-loop or closed-loop control.

7. A method, comprising:
operating a hydraulic vehicle brake system which has an anti-lock control device and a master brake cylinder with a controllable brake booster, at least one wheel brake, which is connected to the master brake cylinder via a brake pressure-increasing valve, and a brake pressure-decreasing valve by which a wheel brake pressure of the at least one wheel brake is configured to be decreased, wherein the anti-lock control device has at least one separating valve through which the vehicle brake system is connected to the master brake cylinder;
closing the separating valves during an anti-lock control operation; and
reducing an extraneous force of the brake booster to zero upon closure of all the separating valves are during the anti-lock control operation.

* * * * *